United States Patent [19]

Sprung

[11] Patent Number: 4,956,936
[45] Date of Patent: Sep. 18, 1990

[54] METHOD AND SYSTEM FOR PURIFICATION OF WATER FOR GREENHOUSE STRUCTURES

[76] Inventor: Philip D. Sprung, c/o 1001-10th Ave., S.W., Calgary, Alberta, Canada, T2R 0B7

[21] Appl. No.: 281,189
[22] Filed: Dec. 7, 1988
[51] Int. Cl.[5] ............................................. A01G 9/00
[52] U.S. Cl. ............................................. 47/17; 47/26; 47/27
[58] Field of Search ................. 47/17, 19, 26, 27, 62, 47/65, 66, 82, 39; 52/747; 126/428

[56] References Cited

U.S. PATENT DOCUMENTS

| | | | |
|---|---|---|---|
| 1,164,128 | 12/1915 | Sexton | 47/19 |
| 1,220,279 | 3/1917 | Sexton | 47/19 |
| 1,936,732 | 11/1933 | Renard | 47/17 |
| 2,350,721 | 6/1944 | Brown | 47/17 |
| 3,016,801 | 1/1962 | Michel | 47/17 |
| 3,461,605 | 8/1969 | Stanhope | 47/17 |
| 4,137,687 | 2/1979 | Sprung | 52/747 |
| 4,195,441 | 4/1980 | Baldwin | 47/17 |
| 4,209,943 | 7/1980 | Moeller et al. | 47/59 |
| 4,262,656 | 4/1981 | Esposito | 47/17 |
| 4,366,646 | 1/1983 | Pratt | 47/17 |
| 4,430,828 | 2/1984 | Oglevee et al. | 47/17 |
| 4,597,272 | 7/1986 | Marx, II et al. | 47/17 |

FOREIGN PATENT DOCUMENTS

| | | | |
|---|---|---|---|
| 2446591 | 8/1980 | France. | |
| 1071270 | 7/1984 | U.S.S.R. | 47/17 |
| 1443517 | 7/1976 | United Kingdom | 47/27 |

Primary Examiner—Robert A. Hafer
Assistant Examiner—Charles H. Sam
Attorney, Agent, or Firm—Kenyon & Kenyon

[57] ABSTRACT

A method and system for purification of water for plants in a greenhouse structure. The method comprises condensing water vapor in the air in the greenhouse on the greenhouse walls, collecting the condensed water at the base of the walls and passing the collected water to the roots of the plants. To accomplish this method the system comprises a water supply for water to be purified, a mist generator for the air in the greenhouse from the water supply means and a heat source to generate heat in the greenhouse for vaporization of the mist. Cooling means are provided for the walls to cause water vapor in the air in the greenhouse to condense on the interior surfaces of the walls. The condensed water is collected and carried by conduit means to a nutrient solution reservoir for admixture with nutrient to be supplied to the roots of the plant.

20 Claims, 5 Drawing Sheets

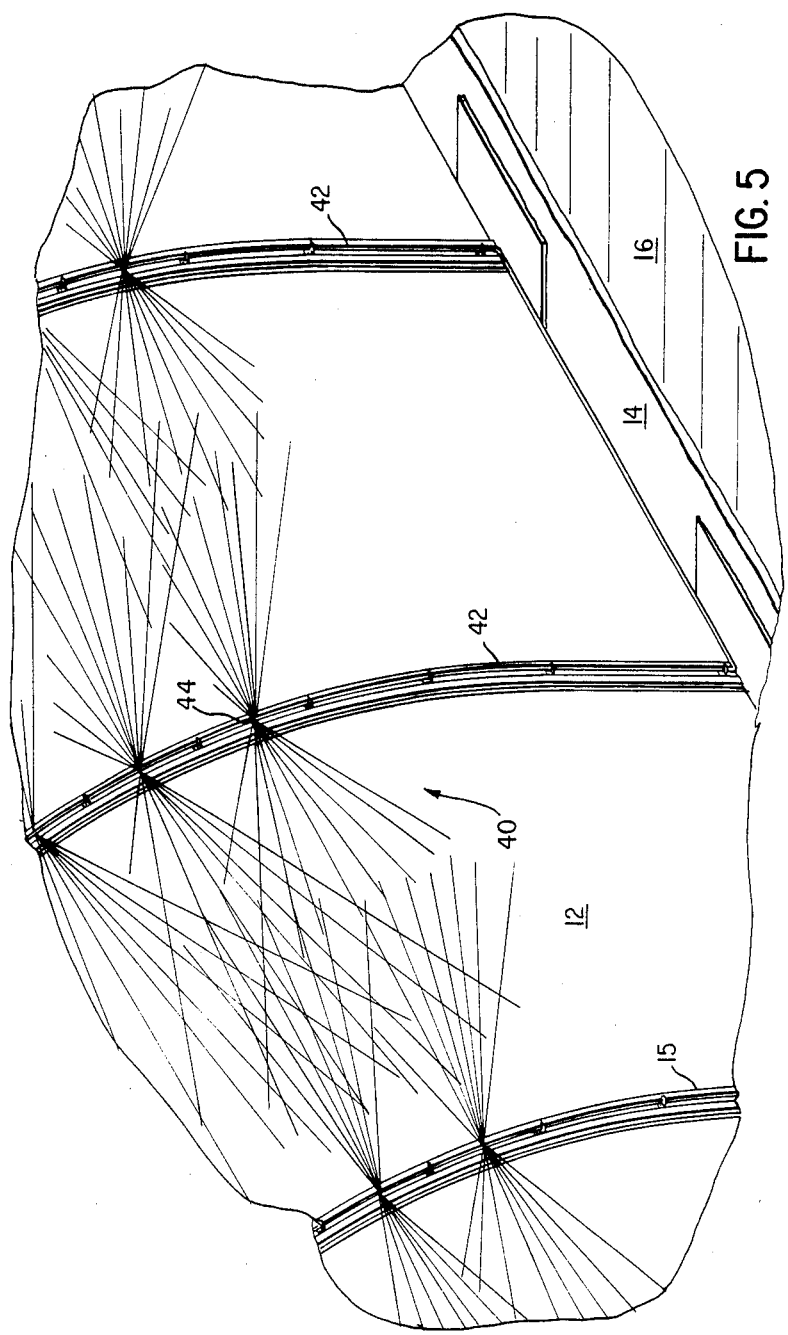

METHOD AND SYSTEM FOR PURIFICATION OF WATER FOR GREENHOUSE STRUCTURES

This is a continuation of application Ser. No. 947,698 filed Dec. 30, 1986.

BACKGROUND OF THE INVENTION

This invention relates to a method and system for purification of water, and more particularly to a method and structure for Purification of water to be fed to the roots to plants grown in greenhouse structures Traditional greenhouse structures, consisting of transparent panes of glass forming a roof to enclose a growing area and having a heater for winter months, While adequate for many purposes, possess many shortcomings which make them unsuitable for year-round production of many types of fruits and vegetables in certain climatic conditions, e.g. in far Northern or far Southern climates Where temperature and light conditions may be poor. For example, outside air, which may contain substances which are not conducive to proper growth of plants, is permitted to enter. Also, exhaust products from the greenhouse heater which often is a natural gas or oil furnace, may be present in the environment within such greenhouses again causing reduced plant growth. The water Which is used in such greenhouses is often local water and again may contain impurities or compositions which impede plant growth. There is an increasing awareness of the detrimental impact of impurities in the air or water on plant growth. In addition, the concentration of elements required for plant growth such as calcium, nitrogen and phosphorus in water being fed to plants in conventional greenhouses may change from day-to-day, resulting in irregular plant growth.

As a result, in recent years there has been a trend towards development of controlled environment horticultural or agricultural installations. For example, Canadian Patent No. 1,097,075 of Miller issued Mar. 10, 1981 describes and illustrates a nutrient supply system for such a controlled environment agricultural installation incorporating nutrient film techniques in which plant root masses are arranged to be wetted by contact with a small stream of liquid nutrient. Capillary attraction or wicking then is relied upon to extend the nutrient-wetted area over and through the entire root mass. Nutrient supply is achieved by positioning the plant roots in long troughs and flowing a thin stream of liquid nutrient along the bottom to the trough permitting the stream to contact each of the plant root masses as it flows along. Excess nutrient is recycled usually after any needed replenishment of its compositional elements.

Such attempts to control in a greenhouse the various conditions responsible for plant growth have heretofore been extremely limited in scope. Thus for example in Miller Canadian Patent No. 1,097,075, only the nutrient feed is controlled. In Canadian Patent No. 982,426 of Delano et al issued Jan. 27, 1976, a method of controlling the amount of solar heat and light which enters a glass or plastic greenhouse is described wherein a liquid is coated on the glass or plastic film of the greenhouse. The liquid dries into a coating which is transparent under certain conditions and non-transparent under other conditions In Canadian Patent No. 955,748 of Glatti et al issued Oct. 8, 1984, the light passing through a translucent covering of a greenhouse is partially controlled by coating the inner surface of the translucent covering with a surface-active agent, which surface-active agent reduces the contact angle of water-condensate droplets formed on the inner surface thereof to below 75°.

Other patents of general background interest describing different types of greenhouse structures include U.S. Pat. No. 4,195,441 of Baldwin issued Apr. 1, 1980 (solar greenhouse in which plants are used as solar collectors to absorb solar radiation and store it in a heat reservoir beneath the greenhouse) and U.S. Pat. No. 4,352,256 of Kranz issued Oct. 5, 1982 (greenhouse structure including a central hub and arms comprising growth chambers extending radially outwardly therefrom).

None of these previous attempts to provide controlled environment greenhouses have adequately addressed the problems created by water of varying chemical content which is normally supplied to the plants in the greenhouse. Different plants require chemical nutrients of certain types for proper plant growth, these nutrients varying from plant to plant and even varying, for a given plant, at different stages of its growth. Water supplied to greenhouses may vary in chemical composition from season to season, whether that water comes from a well, municipal water source, river or lake, or elsewhere. It may contain some ingredients which are helpful to plant growth and others which are harmful to plant growth. In most greenhouse installations, minimal or no chemical analysis of the composition of water being fed to the plants is carried out, because of the added expense and marginal benefit to be achieved from such chemical analysis. Little or nothing could be done practically speaking in most cases to modify the composition of the water supplied to plants to remove any harmful ingredients from such water and complement the proper ingredients (which might be present in only trace amounts) contained therein with additional nutrient ingredients. Thus, it is usually assumed that the water being fed to greenhouse plants is pure. Nutrients and the like are then added to the water or to the soil about the plants in amounts deemed appropriate based on that assumption.

Also, with the increasing pollution of water supplies in most parts of the world, oftentimes by compounds or compositions which are harmful to plant growth, the results of impure water are increasingly being seen in reduced or less-than-desirable growth of horticultural crops in many regions.

Another problem with conventional greenhouse structures lies in the tremendous quantities of water needed to operate them. This problem is particularly significant in arid regions. Water is absorbed by the plants through their roots in such greenhouses and thereby lost into the plant and its produce. It is also lost to the environment in the greenhouse through transpiration from the plant leaves and through evaporation within the greenhouse.

It is an object of the present invention to provide a method and system for providing water of high purity to plants in a greenhouse which water is devoid of ingredients which may be deleterious to the growth of the plants. It is a further object of the present invention to provide a method and system of supplying water to the plants in a greenhouse which is extremely economical in water consumption when compared to traditional greenhouse methods and structures.

SUMMARY OF THE INVENTION

According to the present invention there is provided a method of purifying water in a building structure having walls enclosing a space. The method comprises condensing water vapour in the space on the walls of the structure and collecting the condensed water at the base of the walls. In a preferred embodiment. The walls are translucent and the mist is vapourized by means of solar energy. The method is particularly adapted for horticultural purposes for plants in a greenhouse. In this case the method comprises condensing water vapour in the air in the greenhouse on the greenhouse walls. Condensed water is collected at the base of the walls. The collected water is then passed to the roots of the plants. In a preferred embodiment, the collected water is mixed with nutrient and then passed to the plant roots.

In accordance with the present invention there is also provided a water purification system comprising a building structure having walls formed from a translucent shell, the shell situated on a base and the shell and base enclosing a predetermined space. The base and shell seal the environment within the space against external environmental air conditions. Means are provided to generate from water to be purified a mist in the space. Means supply the water to be purified to the mist generation means. Means are also provided to vapourize the mist. A cooling means for the walls causes water vapour in the space to condense on the interior surfaces of the walls. Means at the bases of the walls collect the condensed water. In a preferred embodiment the cooling means for the walls comprises spray means for controlled spraying of a film of water over the external surface of the shell.

The system of the present invention is particularly well suited for greenhouses having walls and a nutrient solution supply means for the roots of the plants with a water purification system. The system comprises a water supply means for water to be purified, means to generate a mist in the air in the greenhouse from water from the water supply means and heat generation means to generate heat in the greenhouse for vaporization of the mist. A cooling means is provided for the walls to cause water vapour in the air in the greenhouse to condense on the interior surfaces of the walls. Collection means at the bases of the walls collect the condensed water. Conduit means carry the collected condensed water from the collection means to the nutrient solution supply means to be mixed with nutrient to be supplied to the roots of the plants.

In a preferred embodiment of the greenhouse structure in accordance with the present invention, the walls of the greenhouse are formed from a translucent stressed impermeable fabric which makes a shell, the shell being situated on a base. The shell and base enclose a predetermined space within which the plants are to be grown. The base and shell seal the environment within the space against external environmental air conditions. The mist generation means are positioned within the shell above the base and are associated with control means operable to produce a mist cloud over the plants. Water to be purified is passed into the air in the greenhouse as a mist. The mist evaporates to form water vapour which then condenses on the walls of the greenhouse and is collected at the collection means at the bases of the walls.

The collection means preferably comprises impermeable fabric aprons, the upper end of each of which is secured to the lower parts of the interior surfaces of the walls and the lower end of each of which passes through a slot in the upper side of a collector pipe at the bases of the walls. The lower ends of the aprons are secured within the collector pipe. The aprons collect the water condensing on the walls and pass it into the collector pipes through the slots.

It will be understood that the method and structure in accordance with the present invention result in water of almost distilled water quality being passed to the roots of the plants in the greenhouse. Any impurities which were in the water to begin with would fall to the floor of the greenhouse and be removed by conventional greenhouse cleaning methods. As the method and system of the present invention are particularly adapted to nutrient film technology in which the plants would be in trays carrying an appropriate water-nutrient mixture for the roots of the plant and in which the plant root would be covered by an appropriate covering, there would be little opportunity for impurities from the water or air to become absorbed by the plants.

As well, where the invention and method of the present invention are practiced in a controlled environment structure as described in my co-pending application Ser. No. 06/047,638, in which the environment within the greenhouse is sealed against external environmental air conditions, loss of moisture through transpiration or evaporation becomes extremely limited, making the invention extremely suitable for areas with limited water supply As well, in nutrient film or hydroponic growing systems using the method and system of the present invention, since the water added to the nutrient can with assurance be regarded as being constantly of virtually distilled water purity, nutrient solutions incorporating such water can be made up with extreme accuracy and adapted to particular types of plants or plants at a particular stage in their growth cycle. This can lead to increased plant growth and increased yields of fruit and vegetables when grown under these conditions.

BRIEF DESCRIPTION OF THE DRAWINGS

These and other objects and advantages of the invention will become apparent upon reading the following detailed description and upon referring to the drawings in which:

FIG. 5 is a partial, perspective view of an external spray system for controlled spraying of a film of water over the external surface of the shell of the structure in accordance with one aspect of the present invention;

Figure 1:
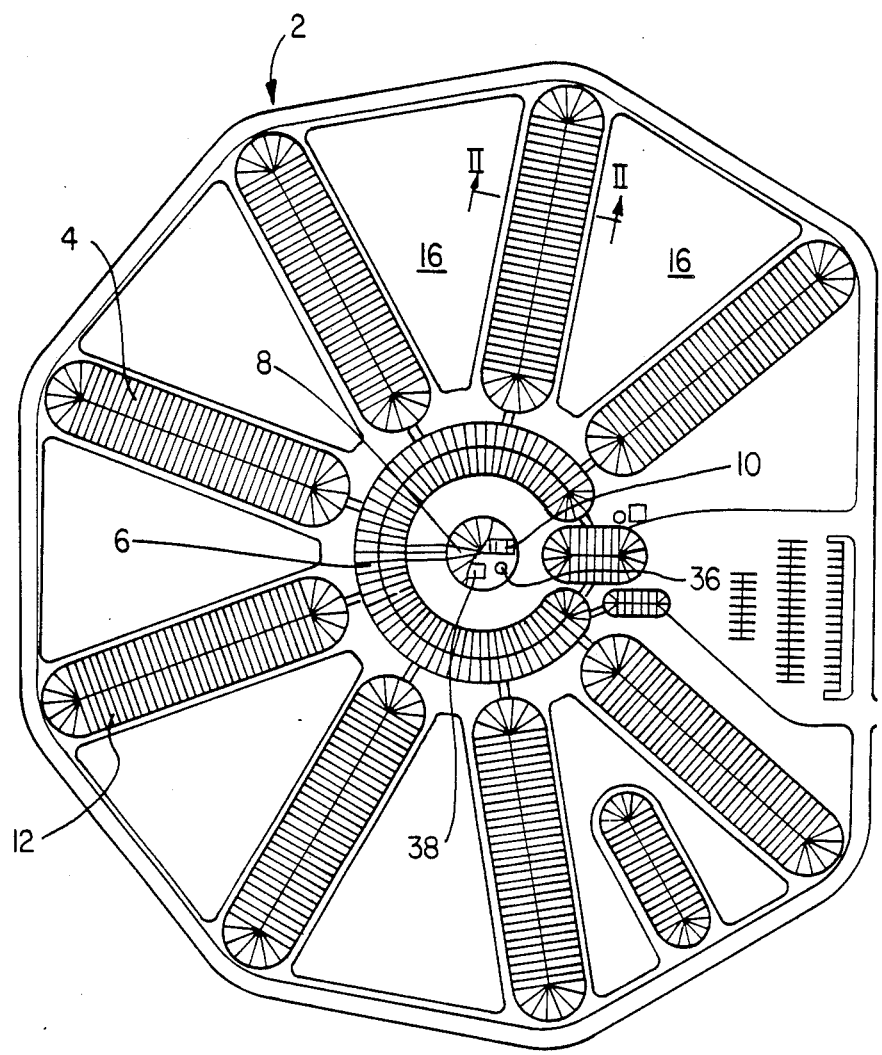
FIG. 1 is a schematic plan view of a structure incorporating the method and system of the present invention.

While the invention will be described in conjunction with an example embodiment, it will be understood that it is not intended to limit the invention to such embodiment. On the contrary, it is intended to cover all alternatives modifications and equivalents as may be included within the spirit and scope of the invention as defined by the appended claims.

DETAILED DESCRIPTION OF THE INVENTION

In the drawings, similar features have been given similar reference numerals.

Figure 2:
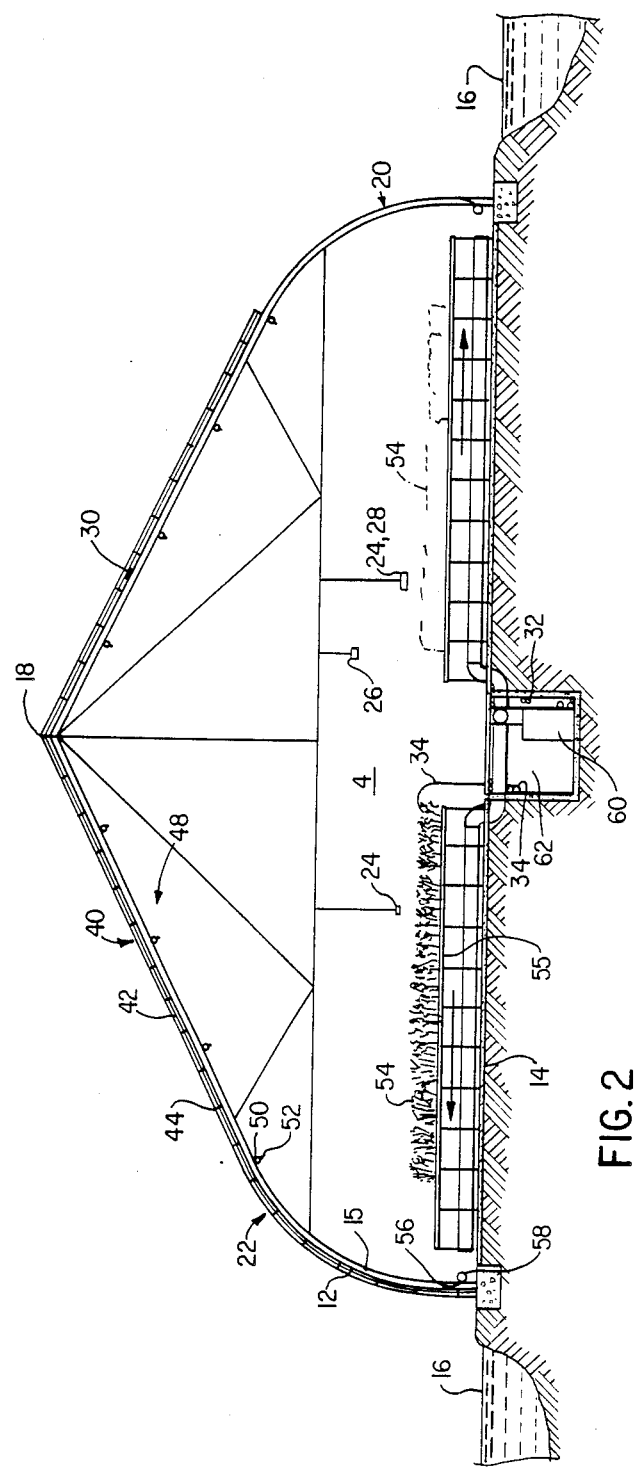
FIG. 2 is a cross-sectional view along lines II—II of FIG. 1. through a shell and base of one of the plant production areas of the structure of FIG. 1.

Turning to FIGS. 1 and 2 there is illustrated a structure 2 in accordance with the present invention, having elongated production areas 4 radially extending outwardly from a central immature crop development area 6 and a central control area 8. The production areas 4 are interconnected to the central shell of the immature crop development area 6 but not to each other as illustrated in FIG. 2. A microprocessor 10. The function of which will be described hereinafter. is shown in central control area 8. The production and immature crop development areas 4 and 6 are enclosed by a translucent, impermeable stressed fabric shell 12 (FIG. 2), forming the walls of the areas, situated on a base 14. The shell and base enclosing a predetermined space (e.g. production areas 4 or immature crop development areas 6). Shell 12 is preferably made of a technically woven polyvinyl chloride coated polyester scrim fabric, with about a 95% light translucency. Such a fabric is highly effective in providing natural light inside the structure. As well such a fabric is highly conductive to heat. The fabric is preferably lightweight (e.g. 18 ounces per square yard). flame resistant as well as resistant to oil, chemicals, greases, rot, mildew and certain types of bacteria which attack polyvinyl chlorides and which are prevalent in a moist environment. It is preferably held between arched rib members 15 which rest on the base, rib members 15 being spread to tension the fabric for example as described in my U.S. Pat. No. 4,137,687 issued Feb. 6, 1979.

As can be seen in FIG. 2. The sides or walls which make up shell 12 extend upward, from base 14, in convex fashion and meet at a crest 18 forming side walls 20 and 22. It is preferred that shells 12 and corresponding bases 14 of each of the greenhouse production areas 4 and immature crop development areas 6 as illustrated in FIG. 1 seal the environment within such areas against external environmental air conditions. This makes possible not only the close control of environmental conditions within each of the areas of the structure, but also ensures that water vapour or mist in the air in each of the sections is not permitted to escape to the outside environment.

Each of the shells over production areas 4 and immature crop development areas 6 is proVided with an external spray system 40 (FIGS. 2 and 5) consisting of a series of pipes 42 supplying water which may be, for example from a source (not shown) in central control area 8 or from ponds 16. and feeding the water through these pipes to spray nozzles 44 to spray a thin film of water over the exterior surface of shell 12 to cool it as required. To achieve this end the water is first sprayed from nozzles 44 through the air and onto the exterior of shell 12 in a dispersed pattern as illustrated. This spraying through the air provides for evaporative cooling of the water, thereby supplying additional cooling potential to shell 12.

Sensors 30 embedded in shell 12 are electronically connected to microprocessors 10, and either on a timed sequence or as the temperature of the shell builds up to a certain degree, it activates appropriate valves (not shown) to cause water to be sprayed through nozzles 44 over the shell to cool it. The shape of shells or walls 12 over production areas 4 and immature crop development areas 6 is such that this water film will run down the exterior surface of the shells. Nozzles 44 are preferably directed to provide an even spray over most of the exterior surface of shell 12 over production areas 4 and 6, as required. Water so sprayed over shells 12 may be collected as required by any appropriate retrieval means.

Besides cooling the shell, this water sprayed over shell 12 cleans the fabric and also magnifies and increases the light intensity as its enters the structure. This magnification factor increases the light intensity in such a way that it is much brighter inside the structure than outside, thus contributing to the significantly increased growth rate of plants experienced inside shell 12.

Shown schematically in FIG. 2, is a transverse section view of a greenhouse production area 4, in which a series of temperature monitors 24, carbon dioxide monitors 26 and relative humidity monitors 28 for the interior atmosphere are provided. Each of the greenhouse production areas are also provided with carbon dioxide delivery systems 32 and nutrient delivery systems 34, the systems delivering respectively carbon dioxide and nutrient solution from sources preferably located in central control area 8. Microprocessor 10, electronically connected to monitors 24, 26, 28 and 30, controls the delivery of carbon dioxide from a source 36 (FIG. 1) and nutrient from reservoir nutrient solution mixing tanks 38 in central control area 8 to areas 4 and 6.

Internally, purified water is produced by water purification system 48 which comprises water supply pipes 50 feeding fog nozzles 52, which nozzles produce, as required, a fine mist or cloud of water droplets in the atmosphere in the space over plants 54 (FIG. 2). This system also achieves temperature control within the greenhouse area, and is activated by temperature monitors 24, electronically connected to microprocessor 10. This microprocessor activates system 48 when the temperature within the immature crop development or production area exceeds a predetermined level and/or on a predetermined time basis. As the mist or cloud evaporates under the heated conditions within the shell, turning the droplets of water to water vapour, the evaporated water vapour then condenses on the cooler internal shell surface.

It should be noted that this process also acts to cool the greenhouse. Firstly by impeding by the passage of rays of sunlight to the plants thereby shading them, and secondly as the mist or cloud evaporates under the heated conditions within the shell, by drawing heat from the environment in the space in the shell. The evaporated water vapour, when it condenses on the cooler shell surface, passes heat of condensation to the shell and, hence, to the environment outside the shell. Since the shell is of a heat conductive material, this aids in passing of heat from the internal to the external side of the shell and out of the internal environment of production area 6 or immature crop development area 6.

In addition, water vapour within the greenhouse area may build up as a result of transpiration from the leaves of plants 54, or from evaporation from trays 55 in which the plants sit.

Figures 3, 4:
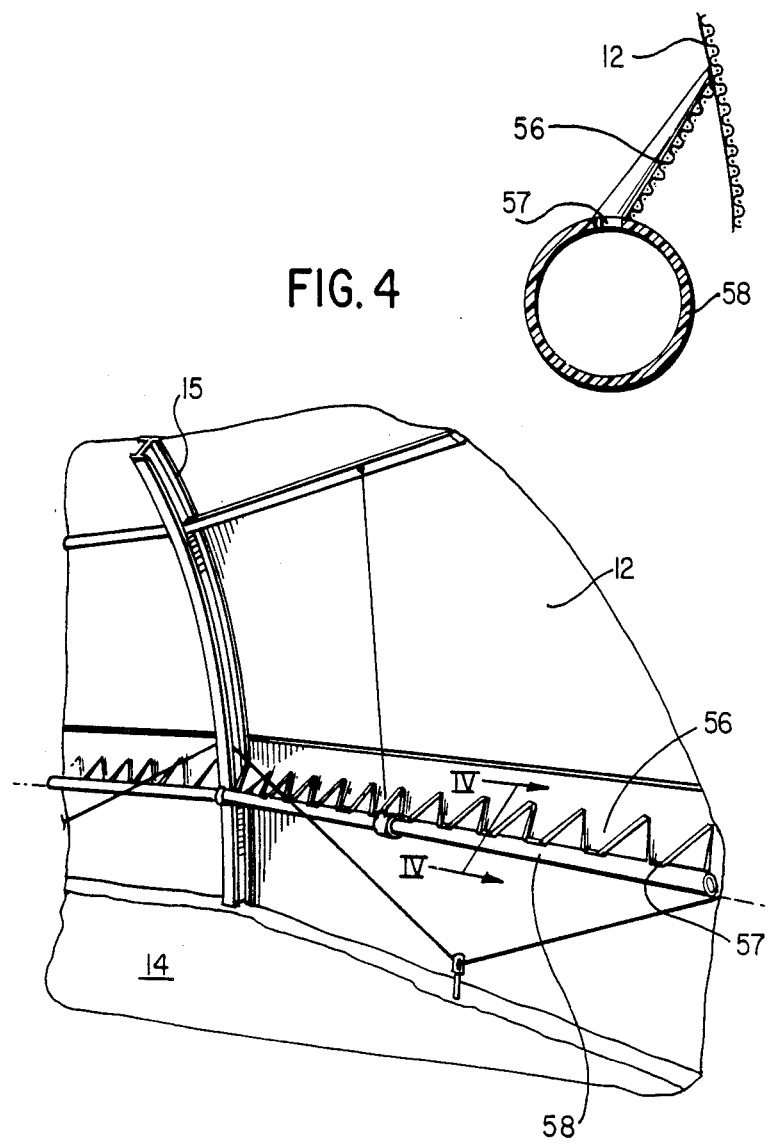
FIG. 3 is a partial perspective view of the interior of one of the walls of the structure of FIG. 1 illustrating the water collection means according to the present invention.
FIG. 4 is a partial cross-sectional view along lines IV—IV of FIG. 3.

Water vapour from these various sources, condensing on the cool, interior surface of shell or wall 12, because of the cohesive nature of the water with respect to the fabric of shell 12, then travels down that wall and is collected by means of collection skirts (evaprons) 56 and collection pipes 58 (FIGS. 2, 3 and 4). Collection pipes 58 are preferably inclined to return this condensed water to a central location where it is passed to central control area 8 and mixed, in predetermined amounts, with nutrient in mixing tanks 38. Nutrient solution is then passed, by nutrient solution feed pipes, to trays 55 for feeding the roots of plants 54.

Collection pipes 58 preferably run along the entire inside base perimeter of both production areas 4 and immature crop development areas 6. The collection skirts 56 ars preferably polyvinyl chloride fabric skirts which electronically seam sealed onto the inner wall or surface of the shell 12. The fabric is then folded in such a way that it will flow into and fit into collection pipas 58 which may be, for example, three inch diameter polyvinyl chloride pipes, through slots 57 spaced along the tops of pipes 58. The slots may be, for example twelve inches long and three-eighth inches wide. Each skirt 58 is secured in place in its associated slot 57 by tieing or clipping it to the pipe 58. In this manner, allowance is made for moVement of skirt 56 and the skirt is prevented from pulling out from the slot 57. The pipe is sized to give stablility to the system and carry away condensed water during peak times.

The system in accordance with the present invention also may be used to control humidity conditions within each of the areas 4 and 6, as dictated by relative humidity sensors 28, by passing water through supply pipes 50 and passing it into the atmosphere within the greenhouse area as a cloud or mist through fog nozzles.

As well, as one can imagine, one of the problems of adapting a greenhouse structure in which the internal environment is sealed against external environmental air conditions, when applied to large scale production from crops within the greenhouse, is the build up of water vapour in the air. This build up results from transpiration from the plants. If it is permitted to continue unchecked, the relative humidity in the greenhouse structure will build up to the paint that transpiration of the plants is significantly impeded. As plants require transpiration for example to cool their leaves and to draw nutrient solution through the plant system, the growth of the plant is thus adversely affected. While the structure could be opened to the outside environment to permit the humidity which has become built up within the structure to escape, this may create unwanted temperature differentials within the greenhouse structure and be quite impractical, for example in winter conditions. It will be readily understood, therefore, that the condensation of water vapour on the interior surface of shell 12 and the removal of that condensed water by means of collection skirts 56 and collection pipes 58 helps to control the humidity conditions within the greenhouse structure so that proper transpiration of the plants is continuously permitted without requiring the greenhouse structure to be opened up to the outside environment.

Figure 6:
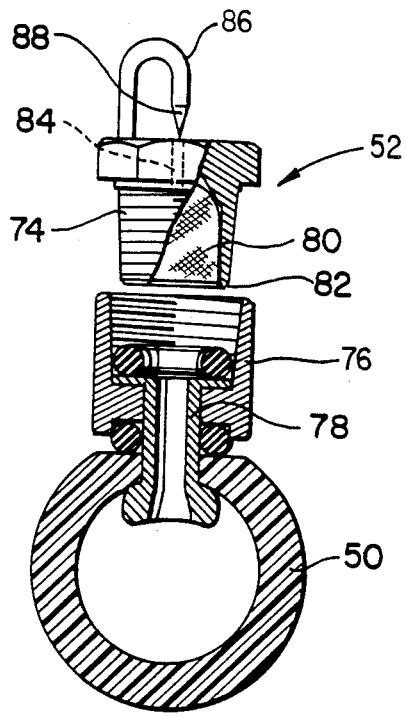
FIG. 6 is an elevation view, in partial section of a fog nozzle of the system in accordance with the present invention

Fog nozzles 52 are illustrated in more detail in the section view of FIG. 6. Each nozzle consists of a body portion 74 which threadably engages an adaptor 76 which provides fluid communication through rivet 78 from the interior of water supply pipe 50 to the interior of body 74. An appropriate nozzle filter 80 is provided within the central fluid receiving chamber 82 of body 74. Water passing into chamber 82 under pressure is then passed through a narrow nozzle opening 84. At the exit from nozzle opening 84 is an impact pin 86 comprising a conical head 88 pointed at opening 84, against which head the stream of water passing out of the nozzle through opening 84 impacts and is broken into fine droplets, to form the mist or cloud required.

Figure 7:
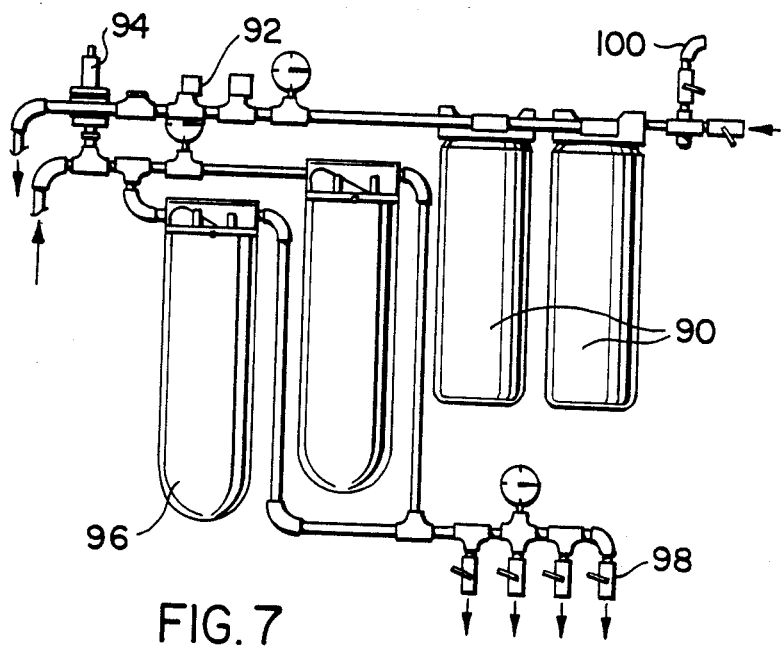
FIG. 7 is a schematic plan of the water filtering and distribution manifold of the system of the present invention.

Turning to FIG. 7, there is shown a schematic drawing of the filtering an distribution manifold for supplying water to fog nozzles 52 through supply pipes 50. Water under low pressure (e.g 160 p.s.i.) is filtered through filters 90 and, as dictated by solenoid valves 92 which are controlled by microprocessor 10 depending on temperature and relative humidity requirements within the greenhouse area in question or upon a predetermined time sequence, is passed through pressure regulator valve 94, through a high pressure pump (not illustrated), through high pressure filters 96, and through distribution valves 98 to supply lines 50 to nozzles 52. The pressure of water through supply lines 50 may be, for example. 1,000 p.s.i.

Water entering the filtering and distribution manifold may also preferably have been subjected to further purification steps (not illustrated) such as ultra violet radiation and chlorine injection through valve 100.

It will be understood that nutrient delivered through nutrient delivery system 34 is passed to trays 55 in which sit the roots of plants to be grown (in production areas 4) or inert blocks of seeds or seedlings (immature crop development areas 6). As is conventional in the art, excess nutrient solution not required by the plants, seeds or seedlings is collected and returned to nutrient mixing tank 34. It is preferred to slope base 14, particularly in each production area 4 downwardly from the centre towards the sides and from the outer ends to the inner ends to facilitate collection of excess nutrient and water from these areas.

In using the method and system according to the present invention, it will be understood that, essentially using solar heating through the translucent shell of the greenhouse (in conjunction, if necessary, with heat from furnaces 60 in basement corridor 62 (FIG. 2)), water from fog nozzles 52 is purified by distillation, collected and then admixed with nutrient or otherwise returned to the roots of the plants. Not only does this system provide an extremely economical way in which to provide purified water for growing of plants, when conducted in a sealed environment, the method is extremely efficient in water consumption. Effectively the only water which is lost from the system is that which goes out with the plants and the produce from the plants, in conjunction with whatever (relatively little) water is required for cleaning the floor of the production or immature crop development area in question to remove any materials which settle out.

Turning again to FIG. 1, there will be noted a smaller structure 102 situated between two of the elongated production areas 4. This structure 102 is of a similar construction to that of the structure housing production areas 4, except it has no plants in it and is intended specifically for bulk generation of purified water. Since no plants are present, it possible to allow the internal temperature of this building to become much higher than in the production areas 4 or immature crop development area 6. This increase the water carrying capacity of the air dramatically. This higher water content of the air, plus the increased convective air transport to the walls of structure 102 because of greater temperature differential between the internal air of that structure and the walls, serves to increase the efficiency of the water recovery system of structure 102. Again the walls of building 102 are externally cooled using an external space system 40 (FIG. 5). An internal water purification system 48 (FIG. 2) and a purified water collection system using collection skirts 58 and collection pipes 58 (FIGS. 3 and 4) are utilized. Building structure 102 is also important since it allows for recovery of nutrient solution for example when a nutrient solution reservoir 38 is discharged or a plant cycle is terminated. This discharge of nutrient solution takes place because of a buildup of undesirable compounds in the nutrient solution, either introduced in the original water supply to the structure 2, or from an unequal absorption of all nutrients in the nutrient solution (e.g. The plants may not need all the sulphate which is introduced to provide the right amount of magnesium which is introduced in the form of magnesium sulphate).

As well, the microbal content of normal water supply to structure 2 from whatever outside source, whether city water, well water, or the like may be too high. City water treatment facilities do not completely remove all of the microbes present. Also, to provide ultra-violet treatment to kill all of the microbes may be prohibitively expensive. However, by passing outside water through a first purification cycle in building 102, all of the microbes (or indeed any other unwanted impurities in the water) can be removed before it is passed into the nutrient solution being fed to the plants in production areas 4 and immature plant development areas 6

It will therefore be appreciated that the method and structure according to the present invention can have application anywhere where large quantities of purified water are required, whether for use in greenhouses or elsewhere. Thus it is apparent that there has been provided in accordance with the invention a method and system for purification of water for greenhouse and other structures that fully satisfies the objects, aims and advantages set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. In a greenhouse for growing plants, the greenhouse having walls and nutrient solution supply means for the roots of the plants, a water purification system comprising:
   (a) a water supply means for water;
   (b) means communicating with said water supply means to generate a mist in the air in the greenhouse from the water supplied from said water supply means;
   (c) heat generation means in the greenhouse to vaporize the mist therein;
   (d) cooling means to cause water vapor in the air in the greenhouse to condense on the interior surfaces of the walls;
   (e) collection means in the bases of the walls to collect condensed water; and
   (f) conduit mean communicating with said collection means to carry the collected condensed water from the collection means to the nutrient solution supply means to be mixed with nutrient to be supplied to the roots of the plants.

2. A greenhouse according to claim 1 wherein the greenhouse walls are formed from a heat conductive translucent shell, the shell situated on a base. The shell and base enclosing a predetermined space within which the plants are to be grown, the base and shell to seal the environment within the space against external environmental air conditions and wherein the mist generation means are positioned within the shell above the base and associated with control means operable to produce a mist cloud over the plants, whereby water to be purified is passed into the air in the greenhouse as a mist, the mist evaporating to form water vapour which then condenses on the walls of the greenhouse and is collected at the collection means at the bases of the walls.

3. A greenhouse according to claim 2 wherein the cooling means for the walls comprises spray means for controlled spraying of a film of water over the external surface of the shell.

4. A greenhouse according to claim 3 wherein the walls are made from technically woven polyvinyl chloride coated polyester scrim with about a 95% light translucency.

5. A greenhouse according to claim 2 wherein the nutrient solution supply means for the roots of the plants comprises a plant root nutrient monitor means and a plant root nutrient control means for plants grown within the space, microprocessor means being electronically associated with the plant root nutrient monitor and control means and programmed to provide optimum nutrient concentration conditions for nutrient solution being fed to the roots of the plants being cultivated in the space, the nutrient control means comprising a nutrient solution mixing tank. A nutrient source activated by the microprocessor control means to feed nutrient in the tank, and conduits to supply nutrient solution from the tank to the roots of the plants being cultivated, the conduit means carrying water collected in the collection means at the bases of the walls to be mixed to the nutrient solution mixing tank as required with nutrient solution.

6. A greenhouse according to claim 2 wherein the water from the water supply means introduced to the mist generation means is first purified by ultra violet radiation and filtration.

7. A greenhouse according to claim 3 wherein the shell has convex sides extending upwardly to a central peak that spray means being mounted to spray water in a film over the external surface and down both sides of the shell to the base the shell sides having sufficient incline to permit water condensing on the internal surfaces of the walls to pass down the walls to the collection means at the bases of the walls.

8. A greenhouse according to claim 2 wherein the collection means comprises impermeable fabric aprons the upper end of each of which is secured to the lower parts of the interior surfaces of the walls and the lower end of each of which passes through a slot in the upper side of a collector pipa at the bases of the walls, the lower ends of the aprons being secured within the collector pipe, the aprons to collect water condensing on the walls and pass it into the collector pipe through the slots.

9. A greenhouse according to claim 8 wherein a collector pipe extends along the bases of the walls, the pipe being inclined to pass collected water towards the nutrient solution supply means.

10. A greenhouse according to claim 2 wherein the mist generation means comprises a plurality of fog nozzles 11. A greenhouse according to claim 10 wherein water supplied to the fog nozzles is first passed through a filtering and distribution manifold where it is filtered and pressurized.

12. A greenhouse according to claim 11 wherein the fog nozzles each comprise a nozzle body with a small water outlet orifice, water being supplied through a filter in the body to the orifice, and a conical impact head spaced opposite and nearby the water outlet orifice against which water passing through the orifice must impact to be broken into mist droplets.

13. A method of purifying water in a sealed greenhouse structure comprising the steps of sparying water in the form of a mist into the interior of the sealed greenhouse structure;

vaporizing the mix into water vapor within the greenhouse structure;

condensing the water vapor within the greenhouse structure on an internal side of at least one wall of heat-conductive translucent material;

cooling an external side of said wall to cause condensation of the water vapor to water on the internal side of said wall while passing the heat of condensation of the condensed water vapor to said external side of said wall; and collecting the condensed water on said wall at a lower end for recycling.

14. A method as set forth in claim 13 wherein solar radiation passing through said translucent wall vaporizes the mist with water vapor within the greenhouse structure.

15. A method as set forth in claim 13 which further comprises the step of purifying the collected water prior to spraying into the greenhouse structure.

16. A method as set forth in claim 13 which further comprises the step of mixing nutrients with the collected water prior to spraying into the greenhouse structure.

17. In combination, a sealed greenhouse structure having walls of heat-conductive translucent material; p1 means for spraying water in the form of a mist into the interior of said greenhouse structure;

means for vaporizing the mist into water vapor within said greenhouse structure;

means for cooling the external side of said walls to cause condensation of the water vapor to water on the internal side of said walls while passing the heat of condensation of the condensed water vapor to said external side of said walls;

means for collecting the condensed water on said walls at a lower end thereof; and conduit means for re-cycling the collected water from said collecting means to said means for spraying.

18. The combination as set forth in claim 17 which further comprises control means connected with said means for spraying water to produced a mist cloud over plants within said greenhouse structure.

19. The combination as set forth in claim 17 wherein said means for cooling sprays a film of water over said external sides of said walls.

20. The combination as set forth in claim 17 which further comprises a nutrient solution supply means for adding nutrient solution to the condensed water and control means for regulating the amount of nutrient solution to be added to the condensed water.

* * * * *